United States Patent
Crisan et al.

(10) Patent No.: US 8,098,297 B2
(45) Date of Patent: Jan. 17, 2012

(54) PRE- AND POST-SHUTTER SIGNAL IMAGE CAPTURE AND SORT FOR DIGITAL CAMERA

(75) Inventors: Adrian Crisan, San Diego, CA (US); Nikolaos Georgis, San Diego, CA (US); Fredrik Carpio, San Diego, CA (US); Paul Jin Hwang, Burbank, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 396 days.

(21) Appl. No.: 12/365,322

(22) Filed: Feb. 4, 2009

(65) Prior Publication Data

US 2010/0053370 A1 Mar. 4, 2010

Related U.S. Application Data

(60) Provisional application No. 61/190,991, filed on Sep. 3, 2008.

(51) Int. Cl.
*H04N 5/76* (2006.01)
*H04N 5/222* (2006.01)

(52) U.S. Cl. ................. 348/231.2; 348/333.05

(58) Field of Classification Search ............. 348/333.05, 348/333.11, 231.2, 231.6
See application file for complete search history.

(56) References Cited

U.S. PATENT DOCUMENTS

| | | | |
|---|---|---|---|
| 6,570,614 B1 * | 5/2003 | Kubo et al. | 348/231.6 |
| 7,860,319 B2 * | 12/2010 | Obrador et al. | 382/224 |
| 2005/0001908 A1 | 1/2005 | Lee | |
| 2005/0158038 A1 | 7/2005 | Dettinger et al. | |
| 2005/0231631 A1 | 10/2005 | Miyazaki | |
| 2006/0203099 A1 | 9/2006 | Omata | |
| 2006/0221223 A1 | 10/2006 | Terada | |
| 2008/0129854 A1 | 6/2008 | Onoda et al. | |
| 2008/0192129 A1 * | 8/2008 | Walker et al. | 348/231.2 |
| 2010/0045821 A1 * | 2/2010 | Mergler | 348/231.2 |

OTHER PUBLICATIONS

USFREEADS, "CasioExilim EX-S600 6.0 MegaPixles Digital Camera", http://www.usfreeadsc.om/catalogs/28076/item464016.html, Aug. 27, 2008.

* cited by examiner

*Primary Examiner* — Albert Cutler
(74) *Attorney, Agent, or Firm* — John L. Rogitz

(57) ABSTRACT

A camera system includes an image sensor and a processing apparatus receiving image frames from the sensor before and after receipt of a user picture signal. The processing apparatus discards frames that do not meet a quality criterion such as under-exposed frames. Also, the processing apparatus compresses only a subset of remaining frames, specifically, those that meet a compression amount threshold. The remaining frames are presented to a user, who can select a representative frame as the "picture" that was taken.

3 Claims, 1 Drawing Sheet

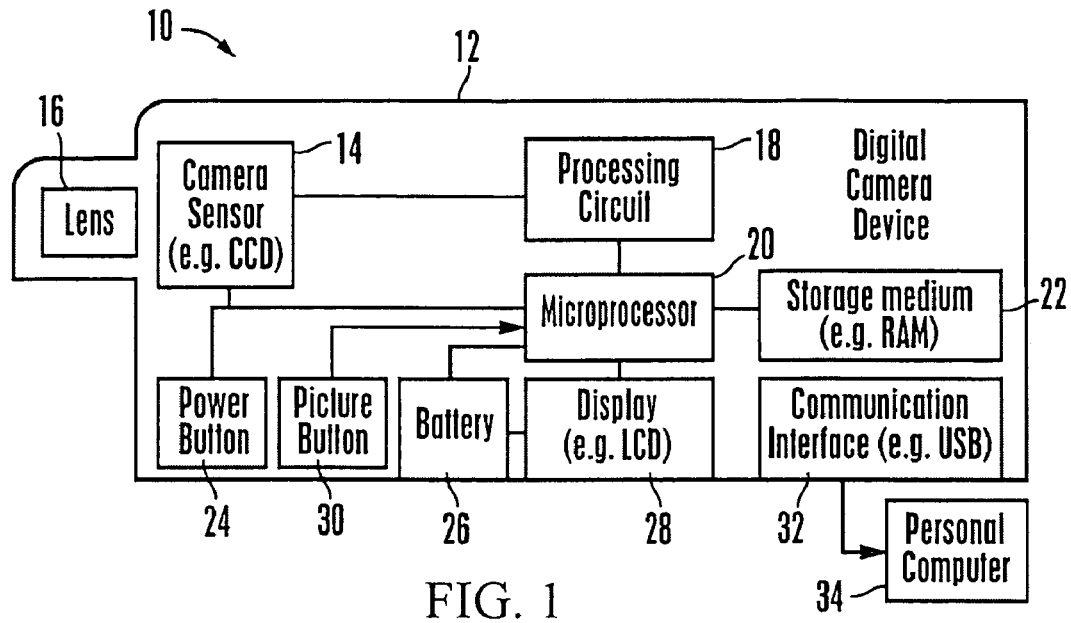
FIG. 1
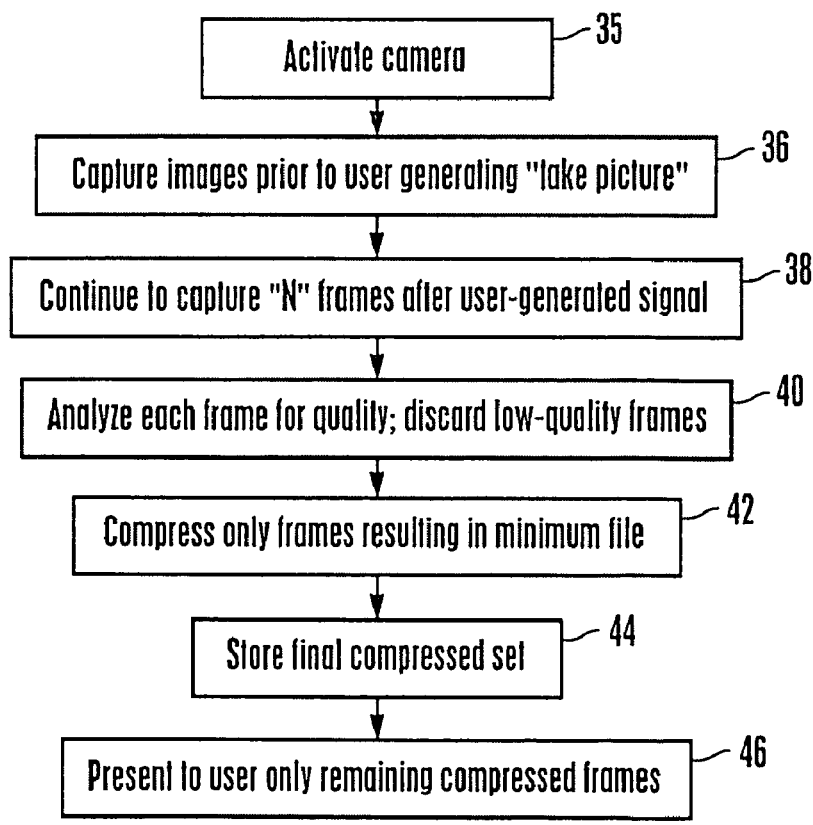
FIG. 2 logic

PRE- AND POST-SHUTTER SIGNAL IMAGE CAPTURE AND SORT FOR DIGITAL CAMERA

This application claims priority from U.S. provisional patent application Ser. No. 61/190,991, filed Sep. 3, 2008.

FIELD OF THE INVENTION

The present invention relates generally to capturing images in a digital camera both prior to and after the user generates a shutter open signal, and then sorting the images for the user to select one or more images.

BACKGROUND OF THE INVENTION

Digital camera users often miss the opportunity to capture an image at the right time. This is sometimes due to the slow camera response of point-and-shoot digital cameras. Another potential reason is that the subject has moved, wrongly posed, framing is not correct or lighting has changed, resulting in a not correctly exposed image. As a consequence, users are often disappointed to realize that the end result is not the desired one when they review their captured images either on the device or on their personal computer.

SUMMARY OF THE INVENTION

A method includes, prior to receiving a take picture signal from a camera user input element, capturing plural digital image frames. The method also includes, after receiving the take picture signal, capturing plural image frames. The captured frames can be considered as establishing an initial set of frames. Frames not satisfying a quality criterion are discarded from the initial set of frames to render a filtered image set. The filtered image set is presented to a user for selection of one or more images therefrom, and responsive to a user frame selection, one or more frames from the filtered image set are stored.

In some implementations the method may include compressing only frames yielding a minimum compressed size to establish a compressed set of frames. Only frames in the filtered image set may be compressed. Frames in the filtered image set may not be compressed if the frame results in a compressed file larger than a threshold. Only frames in the compressed set of frames may be presented to the user.

The method may be executed in a digital camera device and/or in a computer receiving frame information from a digital camera device.

In another aspect, a camera system has an image sensor and processing apparatus that receives image frames from the sensor before and after receipt of a user picture signal. The processing apparatus discards frames that do not meet a quality criterion and compresses only a subset of remaining frames for presentation thereof to a user.

In another aspect, a system includes means for producing image frames prior to and after generation of a picture signal to render an initial set of frames. Means are provided for filtering frames from the initial set of frames based on at least one quality metric to render a filtered set of frames. Also, means are provided for presenting frames from the filtered set of frames to a user for selection of at least one frame.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic block diagram of an example camera; and

FIG. 2 is a flow chart of example logic in accordance with present principles.

DETAILED DESCRIPTION OF THE PREFERRED EMBODIMENT

Referring initially to FIG. 1, a digital camera 10 includes a portable lightweight hand-held housing 12 holding a camera sensor 14 such as but not limited to a charge-coupled device (CCD). The sensor 14 produces images sensed through a lens 16, and in the example non-limiting embodiment shown the images are sent to a processing circuit 18 which executes compression/frame selection logic in accordance with disclosure below, it being understood that the logic of FIG. 2 alternatively may be entirely embodied by software on, e.g., the below-described PC or storage medium.

In turn, the processing circuit 18 may communicate with a camera processor 20 in the housing 12, which can access and store data on a computer-readable medium 22. The medium 22 may be, without limitation, disk-based storage and/or solid state storage and in one implementation is implemented by random access memory (RAM).

To activate the camera 10, a power button 24 may be provided on the housing 12. A user can manipulate the power button 24 to cause one or more camera batteries 26 to energize the components of the camera 10, including the processor 20 and a visual display 28 such as but not limited to a liquid crystal display (LCD). Also, a picture button 30 typically is provided on the housing 12 that can be manipulated by a user to signal the user's desire to capture a frame as a picture. If desired, a communications interface 32 such as but not limited to a universal serial bus (USB) interface may be provided to enable the camera processor 20 to communicate with, e.g., a user's personal computer 34.

It is to be understood that the camera 10 may be implemented as an electronic device with an imaging sensor and storage such as digital cameras per se, camera-equipped mobile phones, personal digital assistants (PDAs), and notebook computers with built in cameras.

Now referring to FIG. 2, at block 35 the camera 10 is activated by, e.g., the user manipulating the power button 24. In the case of a mobile computing device equipped with a camera block 35 may be implemented by the launch of a camera application.

At block 36 images are captured and filtered-compressed as set forth further below, and at block 38 image capture continues after receipt of a user-generated "take picture" signal as might be generated by the user manipulating the picture button 26. In one embodiment, "N" frames are captured after receipt of the "take picture" signal, wherein "N" is an integer; also, if desired only "M" frames (wherein "M" is an integer) prior to the "take picture" signal may be retained.

In any case, proceeding to block 40 the frames that preceded the take picture signal and that were retained in, e.g., a temporary location in RAM along with the frame taken in response to the take picture signal plus the post-signal frames that were retained are analyzed for quality, with frames not satisfying one or more quality metrics being discarded. For example, if a frame is found to be under-exposed, i.e., exposed below a threshold, such a frame may be discarded at block 40, thus saving storage space and bandwidth.

As understood herein, the image sequence captured as described above can be compressed at block 42 using preferably lossless video coding technology to minimize storage requirements, and additionally only certain frames may undergo compression. Specifically, at block 42 only frames that result in a minimal compressed file may be compressed, i.e., only frames that satisfy a compression amount threshold of, e.g., at least 20% compressed are compressed. For example, a frame that might have passed the exposure test at block 40 but nonetheless due to exposure anomalies would result in a significant increase in the size of the compressed file because motion compensation techniques that are used in lossless video coding might fail to find a frame similar to the frame under test and, thus, result in a relatively large file even after compression, would not be compressed at block 42. Thus, only a subset of frames surviving the screening test of block 40 might be compressed at block 42.

The final compressed set of frames from block 42 is stored at block 44 and presented (after decompression) to the user at block 46 on, e.g., the display 28. The frames may be presented automatically or in response to user signals, which may allow the user to scroll through the frames and then select one or more, with non-selected frames being discarded from memory if desired.

In alternate embodiments instead of executing the above-described processing entirely on the camera 10, frames may be sent to a PC or server through the communication interface 32 for processing as described. Also, users not only have the opportunity to analyze captured image sequence on the camera 10 itself, but alternatively may download the frames output by block 42 to the PC 34 and use a software application that allows them to browse the image sequence and re-capture the desired frame.

In the example non-limiting implementation shown, the lossless video coding algorithm is implemented in a hardware processing circuit 18 that directly captures images from the sensor 14, with the camera 10 processing and storing the compressed image sequence to the storage medium 22 using direct memory access (DMA) to minimize processing overhead. However, present principles can be implemented in software in either the camera 10 or the personal computer 34.

If desired, image enhancements in accordance with image enhancing principles known in the art can be applied to the image sequence before being presented to the user. Such enhancement can include but are not limited to applying super-resolution algorithms to the captured frames.

It may now be appreciated that using present principles, users of digital cameras or camera equipped mobile devices have the opportunity to correct problems in captured images by being given the chance to review not only their captured image but also the previous and following frames too. Users can select the frame of their choice either on their device or on their personal computer and finally save it to their album. They also have the opportunity to create mosaics or enhance the quality of the captured image by using super-resolution imaging on the captured image sequence.

In addition to the above, various sensors may be used determine when to start automatic frame capturing. Usage of various sensors such as orientation sensors, heat sensors, camera CCD/CMOS images, proximity sensors, or accelerometers can be used to determine when to capture a picture. For example, the above-described automatic capturing can begin as soon as a proximity sensor detects that the user's face is near the viewfinder eyepiece.

Additionally, metrics such as image contrast or proper exposure may be used to determine if a frame that has been captured automatically is worth keeping or not. Other metrics that may be used are determinations of whether points of interest are located/distributed properly, whether the color/light is properly balanced, etc.

Furthermore two or more frames may be combined using, e.g., super-resolution techniques to create a new picture that is a combination of a few sub-optimal frames and that is much better than any of the original frames, in effect a frame that the user might never have been able to capture otherwise. Super-resolution imaging may thus be used to improve dynamic range and also eliminate camera sensor noise during shooting a night scene.

While the particular PRE- AND POST-SHUTTER SIGNAL IMAGE CAPTURE AND SORT FOR DIGITAL CAMERA is herein shown and described in detail, it is to be understood that the subject matter which is encompassed by the present invention is limited only by the claims.

What is claimed is:

1. Method comprising:
   prior to receiving a take picture signal from a camera user input element, capturing first plural digital image frames;
   after receiving the take picture signal, capturing second plural digital image frames, the captured first and second plural digital image frames establishing an initial set of frames;
   discarding from the initial set of frames at least one frame not satisfying a quality criterion to render a first filtered image set;
   for each frame in the first filtered image set, determining whether the frame satisfies a minimum compression threshold;
   compressing only first frames in the first filtered image set responsive to a determination that the first frames satisfy the minimum compression threshold;
   deleting second frames in the first filtered image set responsive to a determination that the second frames do not satisfy the minimum compression threshold such that only the first frames establish a compressed filtered image set;
   subsequent to decompression of the compressed filtered image set to render a second filtered image set, presenting the second filtered image set to a user for selection of one or more images therefrom; and
   responsive to a user frame selection, storing at least one frame from the second filtered image set.

2. Method of claim 1, wherein the method is executed in a digital camera device.

3. Method of claim 1, wherein the method is executed in a computer receiving frame information from a digital camera device.

* * * * *